(12) United States Patent  
Mizumoto et al.

(10) Patent No.: US 8,803,821 B2
(45) Date of Patent: Aug. 12, 2014

(54) MOBILE DEVICE

(75) Inventors: Akira Mizumoto, Daito (JP); Hayato Takenouchi, Daito (JP); Minoru Niwa, Nisshin (JP)

(73) Assignee: Kyocera Corporation, Kyoto (JP)

( * ) Notice: Subject to any disclaimer, the term of this patent is extended or adjusted under 35 U.S.C. 154(b) by 913 days.

(21) Appl. No.: 12/954,119

(22) Filed: Nov. 24, 2010

(65) Prior Publication Data

US 2011/0128231 A1 Jun. 2, 2011

(30) Foreign Application Priority Data

Nov. 25, 2009 (JP) ................................. 2009-267453

(51) Int. Cl.
*G06F 3/041* (2006.01)

(52) U.S. Cl.
USPC ............................ 345/173; 345/168; 345/169

(58) Field of Classification Search
CPC .............. G09G 5/00; G09G 2310/061; G09G 2320/0247; G09G 2320/103; G09G 2340/12; G09G 5/14; G09G 2320/0261; G09G 2330/022; G09G 2354/00; G09G 2360/144; G09G 3/34; G09G 5/006; G09G 5/373
USPC .......................................... 345/156, 168–179
See application file for complete search history.

(56) References Cited

U.S. PATENT DOCUMENTS

| 7,633,490 B2 * | 12/2009 | Ohshita et al. ............... 345/168 |
| 2008/0143671 A1 * | 6/2008 | Li ................................. 345/156 |
| 2010/0156675 A1 * | 6/2010 | Ganey et al. ................... 341/20 |

FOREIGN PATENT DOCUMENTS

JP 2008-112334 5/2008

* cited by examiner

*Primary Examiner* — Duc Dinh
(74) *Attorney, Agent, or Firm* — Duane Morris LLP

(57) ABSTRACT

A method and system of controlling key operations of a mobile device comprising one or more hard keys and one or more touch keys are disclosed. An operation of one or more hard keys is detected, and measuring an operation time is started in response to detecting the operation. Operations of one or more touch keys are invalidated until the operation time exceeds a certain period of time.

20 Claims, 9 Drawing Sheets

Figure 4

Restriction Time Table        400

| | Time |
|---|---|
| Call key | Q 1m second |
| Call termination key | Q 2m seconds |
| Trackball | Q 3m seconds |

MOBILE DEVICE

CROSS-REFERENCE TO RELATED APPLICATION

The present application claims priority under 35 U.S.C. §119 to Japanese Patent Application No. 2009-267453, filed on Nov. 25, 2009, entitled "MOBILE TERMINAL, PROGRAM FOR CONTROLING KEY OPERATION AND METHOD FOR CONTROLING KEY OPERATION". The content of which is incorporated by reference herein in its entirety.

FIELD

Embodiments of the present disclosure relate generally to mobile devices, and more particularly relate to a mobile device comprising touch keys and hard keys.

BACKGROUND

A capacitance touch switch device may include a panel switch. The panel switch can be an electrode sheet attached to an acrylic board or a control basal plate that is connected to a block that detects changes in capacitance. The panel switch may be turned ON when the block detects a change in capacitance. When both the panel switch and a hard switch are set at the same time, positions of the panel switch and the hard switch become close to each other relative to a size of a mobile device. As a result, when a user operates the hard switch, there may be an operational error involving the panel switch.

SUMMARY

A method of controlling key operations of a mobile device comprising one or more hard keys and one or more touch keys is disclosed. When operation of one or more hard keys is detected, measurement of a hard key operation time starts. Operations of one or more touch keys are invalidated until the hard key operation time exceeds a restriction time.

In a first embodiment, a mobile device comprises one or more hard keys, and one or more touch keys. The mobile device further comprises a first detection module operable to detect a first operation of one of the hard keys. The mobile device also comprises a first measurement module operable to start measuring a first operation time of the first operation when the first operation is detected. The mobile device also comprises a control module operable to invalidate a second operation of one of the touch keys until the first operation time exceeds a predetermined period of time.

In a second embodiment, a method controls key operations of a mobile device comprising one or more hard keys and one or more touch keys. The method comprises detecting an operation of one or more hard keys to obtain a hard key operation, and starting measuring a hard key operation time when the hard key operation is detected. The method further comprises invalidating touch key operations of one or more touch keys until the hard key operation time exceeds a period of time.

In a third embodiment, a computer readable medium comprises program code for controlling key operations of a mobile device comprising one or more hard keys and one or more touch keys. The program code comprises detecting an operation of the one or more hard keys to obtain a hard key operation, and starting measuring a hard key operation time when the hard key operation is detected. The program code further comprises invalidating touch key operations of the one or more touch keys until the hard key operation time exceeds a period of time.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 4 is an illustration of an exemplary restriction timetable stored in memory of the mobile device shown in FIG. 1.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, summary or the following detailed description. The present disclosure should be accorded scope consistent with the claims, and not limited to the examples described and shown herein.

Embodiments of the disclosure are described herein in the context of one practical non-limiting application, namely, an information-processing device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), ATM, personal handy phone system (PHS), lap top computers, TV's, GPS's or navigation systems, machining tools, pedometers, health equipments such as weight scales, display monitors and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A capacitance touch switch/key device may include a panel switch. The panel switch can be an electrode sheet attached to an acrylic board or a control basal plate that is connected to a block that detects changes in capacitance. The panel switch may be turned ON when the block detects a change in capacitance. By recognizing an ON that is too short in time and an ON that is too long in time as invalid ONs with the panel switch, malfunctions of the panel switch caused by water drops and the like can be reduced.

When both the panel switch and a hard switch are set at the same time, the positions of the panel switch and the hard switch become close to each other relative to a size and operability of a mobile device. As a result, when a user operates the hard switch, there may be an operational error involving the panel switch. Embodiments of the disclosure can reduce operational error involving the panel switch.

Figure 1:
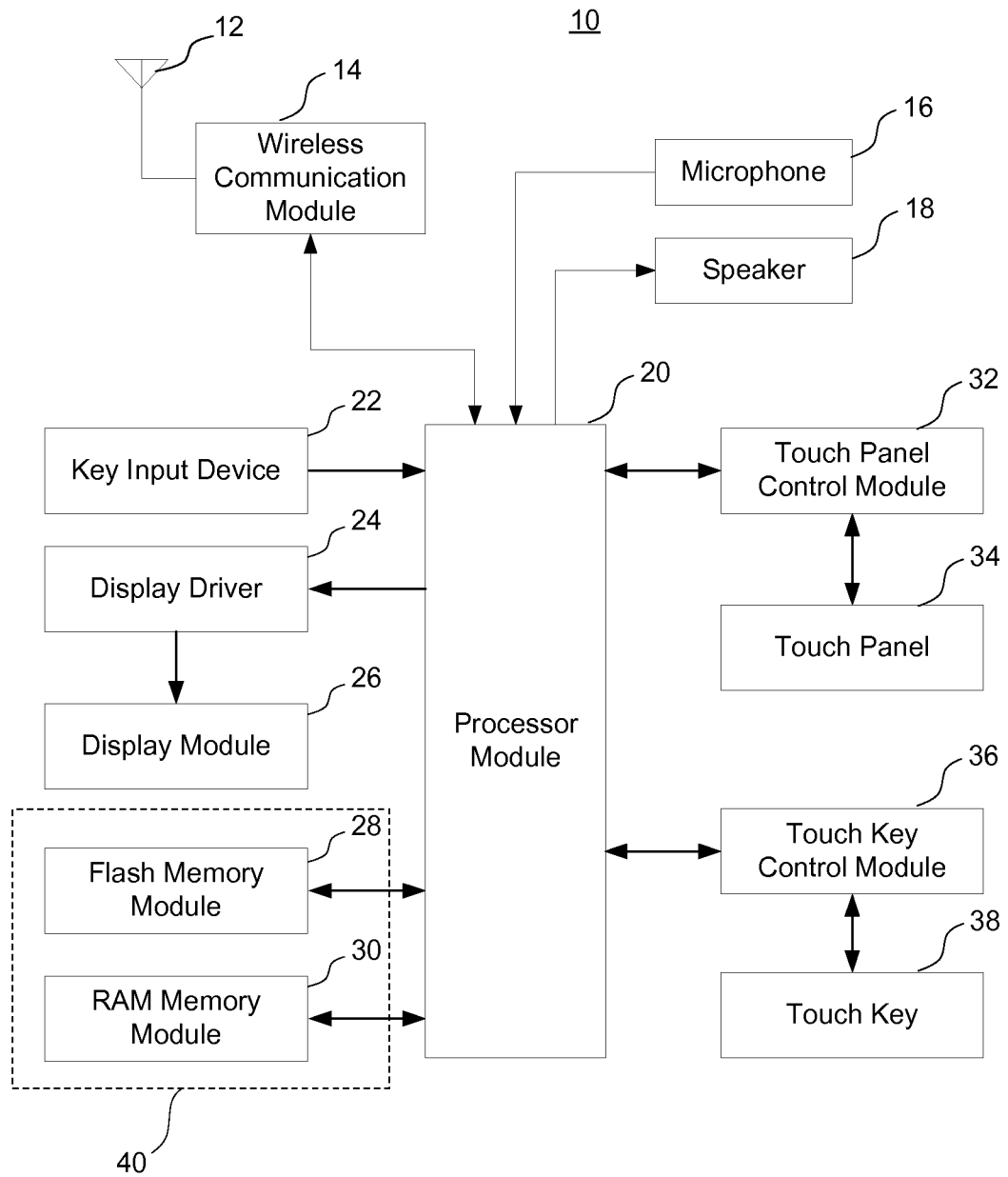
FIG. 1 is an illustration of a schematic functional block diagram of a mobile device according to an embodiment of the disclosure.

FIG. 1 is an illustration of a schematic functional block diagram of a mobile device 10 according to an embodiment of the present disclosure. A mobile device 10 comprises an antenna 12, a wireless communication module 14, a microphone 16, a speaker 18, a processor module 20, a key input device 22, a display driver 24, a display module 26, a flash memory module 28, a RAM memory module 30, a touch panel control module 32, a touch panel 34, a touch key control module 36 and touch keys 38. The antenna 12, the wireless communication module 14, the processor module 20, the display driver 24, the flash memory module 28, the RAM memory module 30, the touch panel control module 32, and the touch key control module 36 may be embedded in a case C (shown in FIG. 2).

A mobile device 10 may comprise a mobile phone comprising a telephone function, and processor module 20 outputs call request signals by controlling a wireless communication module 14. Output call request signals are transmitted by an antenna 12 to a mobile communication network comprising base stations. When a callee performs an operation to answer a call, a state in which the caller and the callee can communicate via sound/voice the mobile phone, is established. The mobile communication network may comprise CDMA, W-CDMA, GSM, TDMA, GDMA, PHS and the like.

The wireless communication module 14 is operable to transmit and receive a plurality of communication signals comprising data signals via a base station. The wireless communication module 14 communicates with the wireless network via a wireless data communication link (not shown). The wireless communication module 14 cooperates with a base station transceiver (not shown) with a suitably configured RF antenna arrangement 12 that can support a particular wireless communication protocol and modulation scheme to transmit and receive the data signals form and to the processor module 20. The wireless communication protocol and modulation scheme may be based on industry current and future standards, such as but without limitation, Third Generation Partnership Project Long Term Evolution (3GPP LTE), Third Generation Partnership Project 2 Ultra Mobile Broadband (3Gpp2 UMB), Time Division-Synchronous Code Division Multiple Access (TD-SCDMA), Wireless Interoperability for Microwave Access (WiMAX), and the like. The data signals may comprise, for example but without limitation, voice data during voice communication, image signal, text data during email, web data during accessing web site, and the like.

The wireless communication module 14 performs processing of audio signals output to the speaker 18 (audio output device) and audio signals input from the microphone 16. That is, the wireless communication module 14 multiplies the audio input from the microphone 16, converts it to a digital audio data by performing analog/digital conversion as well as performing signal processing such as encoding, and outputs it to the processor module 20. Moreover, the wireless communication module 14 performs a signal processing such as decoding, digital/analog conversion, amplification, etc. on the audio data supplied from the processor module 20 to convert it to an analog audio data and output it to the speaker 18.

Figure 2:
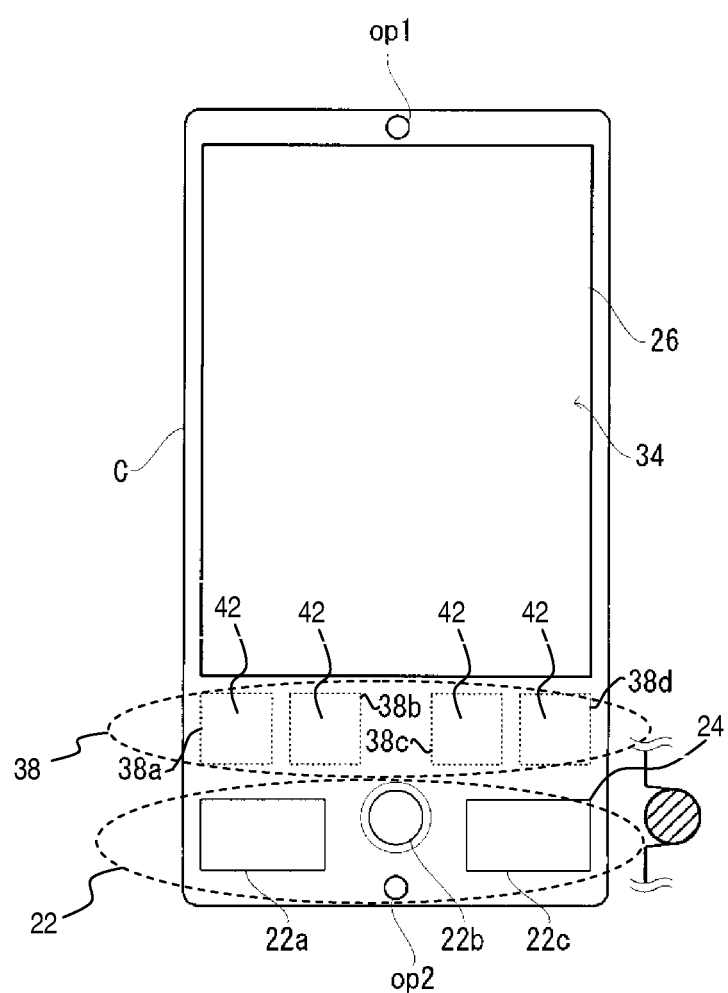
FIG. 2 is an illustration of an exemplary external view of a mobile device shown in FIG. 1.

The key input device 22 is explained in the context of discussion of FIG. 2.

The display driver 24 is operable to operate the display module 26.

The processor module 20 is configured to support functions of the mobile device 10. For example, the processor module 20 may control operations of the mobile device 10 so that processes of the mobile device 10 are suitably performed. For example, the processor module 20 controls the operation of mobile device 10. These operations may comprise, for example but without limitation, audio telephone call, creation and transmission/reception of e-mails, and the like. Furthermore, the processor module 20, controls operations of, for example but without limitation, transmission/reception of signals by the wireless communication module 14, display of images by the display module 26, and the like. In an embodiment, the processor module 20 invalidates a second operation of one of the touch keys 38 until the first operation time exceeds a predetermined period of time as explained in more detail below. The processor module 20 processes, in parallel, multiple tasks that comprises the touch restriction control process shown in the FIG. 6, the touch key operation decision process shown in the FIGS. 7 and 8, and the key control process shown in FIG. 9 under the control of an RTOS (Real-time Operating System) such as Android™, "Linux™, "REX", and the like. The processor module 20, may be implemented or realized with a general purpose processor, a content addressable memory, a digital signal processor, an application specific integrated module, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 20 comprises processing logic that is configured to carry out the functions, techniques, and processing tasks associated with operation of mobile device 10.

When a call is terminated by a key input device 22 after shifting to a state in which the caller and the callee can speak over the mobile phone, processor module 20 controls the wireless communication module 14 and sends a call termination signal. Processor module 20 terminates a call process after sending the call termination signal. Processor module 20 also terminates the call process when the call terminal signal from the call receiver is received first. Processor module 20 also terminates the call process when a call termination signal is received from the mobile communication network regardless of whom the callee is.

When a call request from a caller is received by the antenna 12 while the mobile device 10 is on, the wireless communication module 14 notifies the processor module 20 of incoming data. The incoming data may comprise, for example but without limitation, voice data during voice communication, image signal, text data during email, web data during accessing web site, video data, and the like. Processor module 20 notifies the user by outputting an indicator from the speaker 18 that mobile phone 10 (mobile device 10) is in an incoming state in which a call request is being received. The indicator may comprise, for example but without limitation, a ring tone, light signals from an LED, a vibration of the mobile device 10 by activating (rotating) a motor, and the like. The processor module 20 displays on the display module 26 origin information sent by the caller at the same time as a calling signal by controlling a display driver 24.

The following is executed in a state in which a caller and a callee can perform voice communication over the mobile phone. The antenna 12 receives a voice modulation signal (high-frequency signal) that is sent by the caller. A demodulation and decoding process is performed on the received voice modulation signal by a wireless communication module 14. The demodulated and decoded received voice signal is output from the speaker 18. An encoding and modulation process is performed on a voice signal to be sent, which is captured from a microphone 16 by the wireless communication module 14. The generated voice modulation signal is sent to a callee using the antenna 12 as explained above.

The memory module 40 may be any suitable data storage area with suitable amount of memory that is formatted to support the operation of the mobile phone 10. The memory module 40 is configured to store, maintain, and provide data as needed to support the functionality of the mobile device 10 in the manner described below. In practical embodiments, the memory module 40 may comprise, for example but without limitation, a flash memory module 28, a random access storage device (for example, SRAM, DRAM), such as a random access memory (RAM) memory module 30, a non-volatile storage device (non-volatile semiconductor memory, hard disk device, optical disk device, and the like), HDD, or any other form of storage medium known in the art. The memory module 40 stores, for example but without limitation, a computer program to be executed by the processor module 20, an address book for managing personal information such as a phone number, e-mail address, etc. of a caller and/or a callee, an audio file for playing a ring alert or alarm, an image file for the standby screen, various setting data, temporary data used in the course of program processing, etc. The memory module 40 also stores files for which downloading is completed. The memory module 40 may be coupled to the processor module 20 such that the processor module 20 can read information from and write information to the memory module 40. As an example, the processor module 20 and memory module 40 may reside in their respective ASICs. The memory module 40 may also be integrated into the processor module 20. In an embodiment, the memory module 40 may comprise a cache memory for storing temporary variables or other intermediate information during execution of instructions to be executed by the processor module 20.

The display module 26 may be, for example but without limitation, a liquid crystal display (LCD), organic electroluminescence (EL), an organic light emitting diode (OLED), and the like. Various kinds of information can be displayed on the display module 26 via an image/video signal supplied from the processor module 20 such as but without limitation, a state of the mobile device 10, details of user operation, a telephone number of the destination, display of e-mail contents, game screen, date, time, remaining battery level, success and failure of the transmission, standby screen, and the like.

The touch panel 34 uses a capacitance method that detects changes of capacitance between electrodes that are generated by placing a finger in close proximity of a surface, and detecting presence of a finger or multiple fingers touching the touch panel 34 such as visual objects shown on the touch panel 34 (touched/contacted objects). For example, the touch panel 34 is a pointing device for indicating an arbitrary position on the display module 26. The touch panel 34 detects a touch operation when its surface is operated by pushing, stroking, touching, and the like. The touch panel control module 32 determines a position of the finger in response to the finger touching the touch panel 34, and outputs coordinate data of the position of the finger to the processor module 20. Thus, the user can input directions of operations and diagrams to the mobile device 10 by pushing, stroking, and touching the surface of the touch panel 34.

Similar to the touch panel 34, the touch key 38 uses a capacitance method that detects changes of capacitance between electrodes generated by placing a finger in the close proximity of the display module 26, and can detect that the finger touched the touch key 38. Specifically, the touch key control module 36 measures a capacitance value at regular time intervals, and inputs the measurement results to the processor module 20. The processor module 20 detects presence of a touch on the touch key 38 based on changes of the input capacitance value. The processor module 20 can turn off power to the touch key 38 by issuing a power-off command for the touch key control module 36.

Operations such as the touch and a release may be performed, for example, by a finger of the user, a stylus, and the like. Hereinafter, an operation in which a finger of the user touches the surface of the touch panel 34 or touch key 38 is referred to as a "touch." In contrast, an operation in which the finger is removed from the touch panel 34 or touch key 38 is referred to as a "release." An operation that is performed by stroking the surface of the touch panel 34 or touch key 38 is referred to as a "slide." Coordinates that are indicated by a touch are referred to as a "touched point" (touch starting position), and coordinates that are indicated by a release are referred to as a "release point" (touch terminating position). An operation that is performed by touching the surface of the touch panel 34 or touch key 38 continuously and releasing is referred to as a "touch and release." Operations such as touch, release, slide and touch and release that are performed on the touch panel 34 and the touch key 38 are referred to as "touch operations" as a whole.

FIG. 2 is an illustration of an exemplary external view of a mobile device 10. The mobile device 10 has a straight shape, and has a flat rectangular case C. The microphone 16 (FIG. 1) is embedded in the case C, and an opening OP2 that is coupled to the microphone 16 is provided on the main surface of a first side in a lengthwise direction. Likewise, the speaker 18 is embedded in the case C, and an opening OP1 that is coupled to the speaker 18 is provided on the main surface of a second side in the lengthwise direction.

In the embodiment shown in FIG. 2, a straight type cellular phone device (mobile phone) is shown. Alternatively, the cellular phone device may be a slide type, a rotation type, a folding-type device, or the like. In the slide type, the first casing can slide with respect to the second casing to place the cellular phone in open and closed configures. In a rotation type, one of the first casing and the second casing can be rotated around an axis along a desired direction in which the first casing and the second casing may be rotated with respect to one another. In a folding-type, the first casing and the second casing can open or close via hinge mechanism.

The key input device 22 is a hard key and, comprises a call key 22a, a trackball 22b, and a call termination key 22c. Each key can be located on the main surface of the case C. The trackball 22b is a pointing device that can arbitrarily operate an arrow and a cursor that are displayed on the display module 26. The trackball 22b can be provided such that it does not fall out of the main surface of the case C. The trackball 22b can be pushed in a vertical direction against the main surface of the case C. A hard key may be, for example but without limitation, a 3D (pressing force) sensor, a joystick, an infrared pointing device, a fingerprint sensor pointing device, a pointing stick which comprises TrackPoint™, Acupoint™ and Neuropoiner™, a cross key, a jog dial, a touchpad (for example, an electrostatic pad) and the like. The key input device 22 may comprise a numerical keypad.

The display module 26 is placed such that it is exposed to the main surface of the case C. In addition, a touch panel 34 is provided on the upper surface of the display module 26.

The touch key 38 comprises a first touch key 38a, a second touch key 38b, a third touch key 38c, and a fourth touch key 38d, and each touch key is located on the main surface of the case C. Because each touch key 38 does not have moving parts, touch areas 42 are shown in square shaped dotted lines in FIG. 2; however, a user may not clearly identify these touch areas 42.

A user, for example, can input a phone number by touching a GUI (Graphical User Interface) of a numerical keypad that is displayed on the touch panel 34 of the display module 26, sends a call operation with the call key 22a, and terminates a call with the call termination key 22c. The user can display a menu screen and executes functions by pressing the trackball 22b and by touching the first touch key 38a, the second touch key 38b, the third touch key 38c, and the fourth touch key 38e. The user can select an arbitrary menu by rotating the ball part of the trackball 22b, and can confirm the menu by pressing the trackball 22b, or can select and confirm at the same time by touching the touch panel 34. A user turns the mobile device 10 on and off by holding down the call termination key 22c, and changes the status of the mobile device 10 to a standby status by pressing briefly the call termination key 22c.

In an embodiment, the call key 22a, the trackball 22b, and the call termination key 22c are referred to as "hard key" as a whole in the present disclosure. The first touch key 38a, the second touch key 38b, the third touch key 38c, and the fourth touch key 38e are referred to as "touch key 38" as a whole.

Hard key comprises an operation module, and detects changes of positions, directions, and angles of the operation module an arbitrary combination of these arising from the operation of the operation module, and treats these changes as output signals. An example of the hard key comprises, for example but without limitation, a mechanical switch, a membrane switch, a trackball, and the like.

The touch key 38 detects changes of capacitance and voltage in response to a touch from the fingers of users, and the like, near or touching the touch keys (near or touching are both referred to as touching, etc.), and treats these changes as output signals. The touch key 38 may comprise, for example but without limitation, a touch sensor using the capacitance method mentioned above, a matrix switch method composed of transparent electrodes in a bilayer structure, and a resistance film method in which voltage is applied to 1 of 2 resistance films, where voltage is detected corresponding to the position of an operation on the other resistance film, and the like.

Various types of the touch key 38 in which the touch sensor using the capacitance method is used, can be used. Such as, for example but without limitation, a projection type, a surface type, and the like. The projection type determines locations by measuring the current ratio of multiple electrode patterns. The surface type is composed of a conducting layer and a basal plate, provides electrodes on corners of the basal plate, forms an even electrical field with the conducting layer, and determines touched locations by measuring the current ratio of a corner of the terminal that was touched, for example, by a finger, and the like.

Figure 3A:
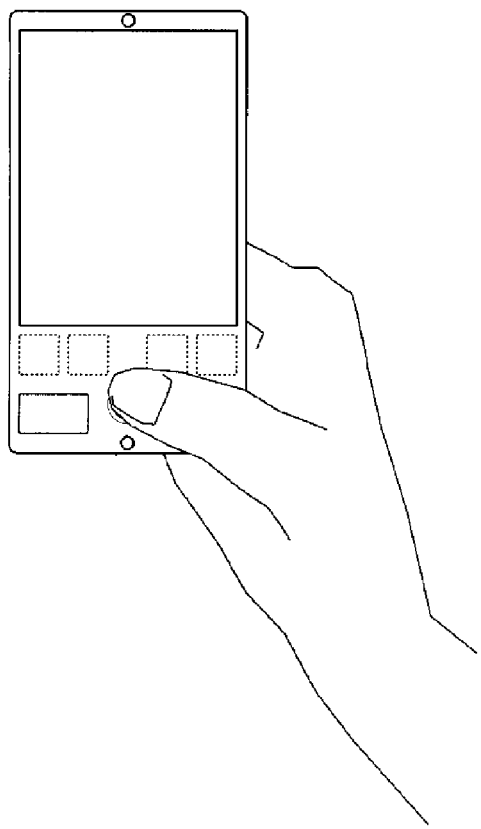
FIG. 3A is an illustration of an exemplary external view of the mobile device shown in FIG. 2, showing a user operating a track ball.

FIG. 3A is an illustration of an exemplary external view of the mobile device 10 shown in FIG. 2, showing a track ball is operated by a user. Operation of the trackball 22b is described as follows with reference to FIG. 3A. A thumb is moved up and down and left and right to rotate the ball area when operating the trackball 22b. Thus, when a user moves his or her thumb up and down to the ball area of the trackball 22b, a user may erroneously touch the second touch key 38b or the third touch key 38c.

Figure 3B:
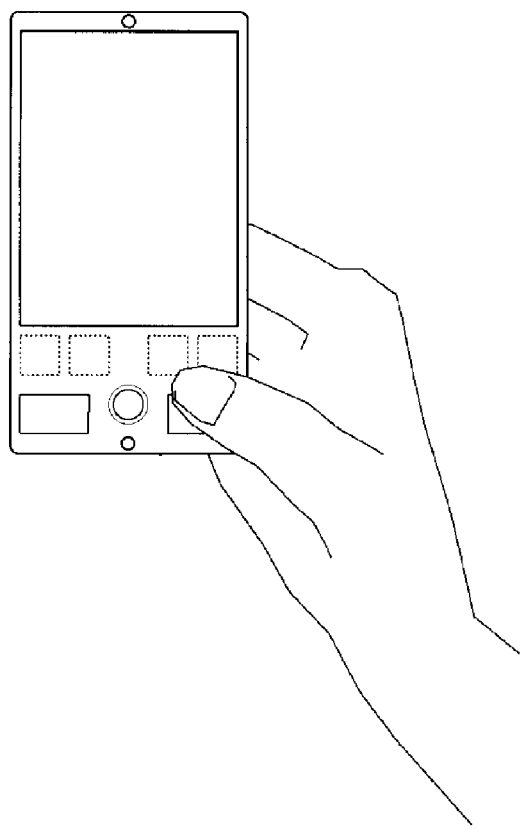
FIG. 3B is an illustration of the exemplary external view of the mobile device shown in FIG. 2, showing a user operating a touch key.

FIG. 3B is an illustration of the exemplary external view of the mobile device 10 shown in FIG. 2, showing a touch key is operated by a user. Operation of the call termination key 22c is describe as follows with reference to FIG. 3B. The call termination key 22c is designed such that it responds normally when any part of the key is pressed/activated. As a result, when a user activates/presses the top right corner 24 of the call termination key 22c, the user's thumb may also touch the fourth touch key 38d.

When the call termination key 22c is pressed/activated in FIG. 3B, it is possible that the fourth touch key 38d is touched when a thumb touches the main surface of the case C, and the call termination key 22c is pressed thereafter. In this case, although a user intended to press the call termination key 22c, the processor module 20 detects that the call termination key 22c was pressed after the fourth touch key 38d is touched, and performs a function that is not intended by the user.

When a user touches the third touch key 38c, it is possible that he/she touches the fourth touch key 38d. In this case, it is possible that the processor module 20 operates a process that corresponds to touch detection of the fourth touch key 38d.

Embodiments of the disclosure, prevent erroneous touches of the touch key 38 by restricting the touch detection time (restriction time: first predetermined time), prioritizing operations for the hard keys, and then identifying the touch key that is touched.

In this manner, once the restriction time is determined, touches of the touch key 38 are invalidated during the period of the restriction time when the hard key 22 such as the call key 22a, the trackball 22b, and the call termination key 22c is activated. The restriction time corresponding to the hard key may be the same for all the hard keys 22 or may be different.

FIG. 4 is an illustration of an exemplary restriction timetable 400 stored in the memory module 40. The restriction time can be changed by the call key 22a, the trackball 22b, and the call termination key 22c. For this reason, the processor module 20 determines the restriction time based on the restriction timetable 400 after identifying the type of the hard key 22 operated. The predetermined period of time is set for each of the hard keys respectively based on usage and type of each of the hard keys. For example, a time when the call key 22a is operated is Q1 and may be, for example but without limitation, equal to 500 m seconds, and the like. The restriction time when the call termination key 22c is operated is Q2 and may be, for example but without limitation 200 m seconds, and the like. The restriction time when the trackball 22b is operated is Q3 and may be, for example but without limitation 300 m seconds, and the like.

In this way, by configuring a restriction time for each of the hard keys 22, an appropriate restriction time can be configured based on the use of each of the hard keys 22. For example, since finger movement is fast when operating the trackball 22b, the shortest restriction time is configured. Since an arbitrary function is expected to be executed by operating an arbitrary touch key 38 immediately after a user briefly presses the call termination key 22c, the restriction time is configured to be relatively short. Since a user may be annoyed when there is an operational error after a call is started, the restriction time for the call key 22a is configured to be long compared to the restriction time for the other hard keys 22. It is acceptable to configure a substantially long restriction time for the call key 22a to prevent detection when the user's face touches the touch key 38 during a call.

As mentioned above, the touch operation is invalidated by not executing a process that detects a touch by the processor module 20. Alternatively, the touch on the touch key 38 is invalidated by turning power off to the touch key 38 or stopping the touch key control module 36 from outputting a capacitance value to the processor module 20.

For example, since an invalidating module (processor module 20 performing invalidation) invalidates operations of the touch key 38, when an input operation is performed on the touch key 38, voltage is applied to a signal line that transmits detected signals from the touch key 38 that were generated by the input operation, so as to prevent voltage changes due to the detected signal (a process using hardware). As a result, even when an input operation is executed with the touch key 38, the processor module 20 does not detect the touch, and does not execute the process that corresponds to the touch.

In other examples, because the invalidating module invalidates operations of the touch key 38, when an input operation is performed on the touch key 38, a process that cancels detection signals of the input operation is executed (a process using software). As a result, even when an input operation is executed with the touch key 38, the processor module 20 does not detect the input operation, and does not execute the process that corresponds to the operation. In this way, a process using hardware or software, as mentioned above, or a combination of these can be used to perform invalidation processes.

When hard key operations are prioritized, even when a touch on the touch key 38 is detected, when an operation on the hard key is detected, the processor module 20 prioritizes and executes the process for the hard key, and invalidates processes that correspond to a touch. Thus, operational errors can be prevented by prioritizing operations against the hard key, over a touch operation on the touch key 38.

When two touch keys or more are touched, the touch key that outputs the highest capacitance value is identified. This is to say that, in an embodiment, identification is performed using a characteristic in which the capacitance value of the touch key 38 increases in proportion to the area of the touching finger. When the capacitance value of the fourth touch key 38d is larger than that of the third touch key 38c, for example, it is determined that the area of the finger that is touching the fourth touch key 38d is larger; hence, the processor module 20 detects a touch on fourth touch key 38d only. In this manner, one of the touch keys from which the highest capacitance value is outputted is selectively detected, if two or more capacitance values outputted from the touch keys exceed a predetermined value. Thus, the touch key 38 is detected as the user intended.

A touch on the touch key 38 is not detected unless the output capacitance value is greater than or equal to a threshold value and its status is greater than or equal to a second predetermined time. A release of the touch key 38 is also not detected unless the output capacitance value falls below the predetermined value, and is more than or equal to a third predetermined time. When a touch operation is detected because a user touches or releases the touch key 38 even for a second, not only is the user may be annoyed, but also power is wasted because the processor module 20 executes an unnecessary process. In an embodiment, based on the above, sensitive responses of the touch keys 38 are prevented by detecting a touch operation based on the capacitance value and the time. Thus, user-friendliness is maintained, and power consumption of the mobile device 10 is reduced.

Because the hard key 22 and the touch key 38 are provided on the same side of the mobile device 10, these effects may be especially noticeable.

Figure 5:
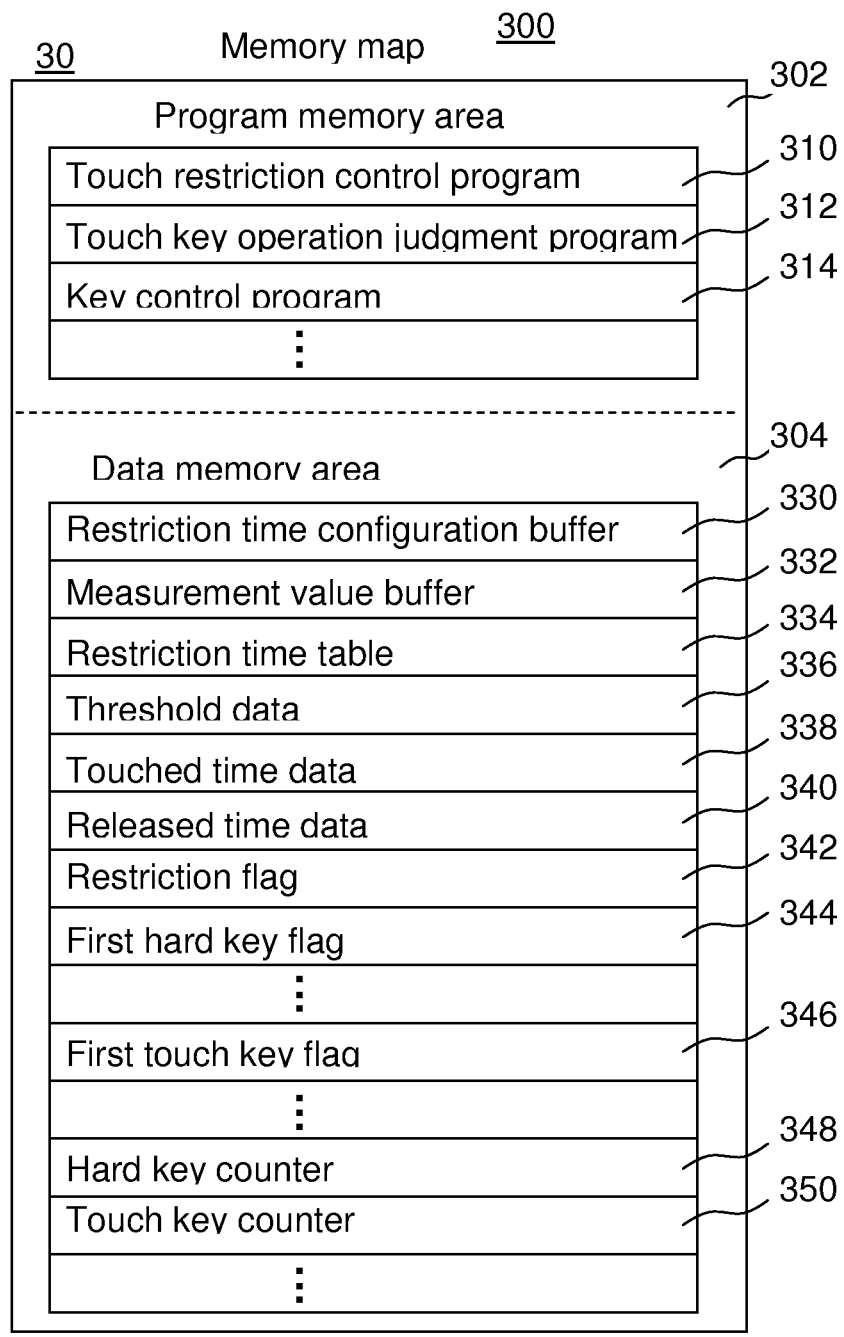
FIG. 5 is an illustration of an exemplary memory map of a mobile device according to an embodiment of the disclosure.

FIG. 5 is an illustration of an exemplary memory map 300 of the RAM memory module 30. The memory map 300 comprises a program memory area 302 and a data memory area 304. A portion of program and data is read all at once or partially and sequentially as necessary from the flash memory module 28, and processed by the processor module 20 after it is stored in the RAM memory module 30.

The program that operates the mobile device 10 is stored in the program memory area 302, and the program comprises a touch restriction control program 310, a touch key operation decision program 312, a key control program 314, and the like.

The touch restriction control program 310 prevents a touch on the touch key 38 when the hard keys 22 such as the, call key 22a, the trackball 22b, and the call termination key 22c, are activated. The touch key operation decision program 312 determines touch, and releases operations on the touch key 38. The key control program 314 prioritizes operations against the hard key over a touch operation on the touch key 38.

Although not shown in FIG. 5, the program that operates the mobile device 10 comprises a program for executing phone functions, and a program for controlling the GUI that is displayed on the display module 26, and the like.

A restriction time buffer 330 and a measurement value buffer 332 are configured in the data memory area, and a restricted table data 334, a threshold data 336, a touched time data 338, a released time data 340, etc. are also stored. A restriction flag 342, a first hard key flag 344, a first touch key flag 346, a hard key counter 348, and a touch key counter 350 are configured in the data memory area 304.

The restriction time configuration buffer 330 stores the restriction time that is configured based on the restriction timetable 400 temporarily. The measurement value buffer 332 is a buffer that stores the capacitance value temporarily as a measurement value that is output by the touch key control module 36.

An example of the restriction timetable data 334 is shown in FIG. 4. The threshold data 336 is a threshold that is compared with a capacitance value when determining touches and releases. The touched time data 338 is used for determining a process of the second predetermined time when a capacitance value is more than or equal to a threshold value. The released time data 340 is used for determining a process of the third predetermined time when a capacitance value falls below a threshold value.

The restriction flag 342 determines whether or not to invalidate a touch on the touch keys 38. The restriction flag 342, for example, consists of a 1-bit register. When the restriction flag 342 is turned on (established), a data value of "1" is configured in the register. In contrast, when the restriction flag 342 is turned off (not established), data value of "0" is configured. Because other flags have similar configurations as the restriction flag 342, this detailed explanation of the configuration of the other flags is omitted.

The first hard key flag 344 is a flag that corresponds to the call key 22a, and is used for determining whether or not the call key 22a has been operated. Although there are no diagrams, the second hard key flag that corresponds to the trackball 22b and the third hard key flag that corresponds to the call termination key 22c are also configured in the data memory area 304.

The first touch key flag 346 is a flag that corresponds to the first touch key 38a, and is used for determining whether or not a touch on the first touch key 38a is detected. Although there are no diagrams, similar to the hard key 22, the touch key flags that correspond to the second touch key 38b to the fourth touch key 38d respectively are also configured in the data memory area 304.

The hard key counter 348 is a counter for measuring time after each hard key 38 is operated (first operating time). The touch key counter 350 is a counter that measures time spent on a touch operation of each touch key 38 (touch operation time and release operating time). The processor module 20, for example, detects a touch when the value of the touch key counter 350 becomes greater than or equal to the second predetermined value.

Image data and the like that are displayed on the display module 26 are stored in the data memory area 304, and counters and flags that are required to operate the mobile device 10 are also configured in the area (not shown).

Figure 6:
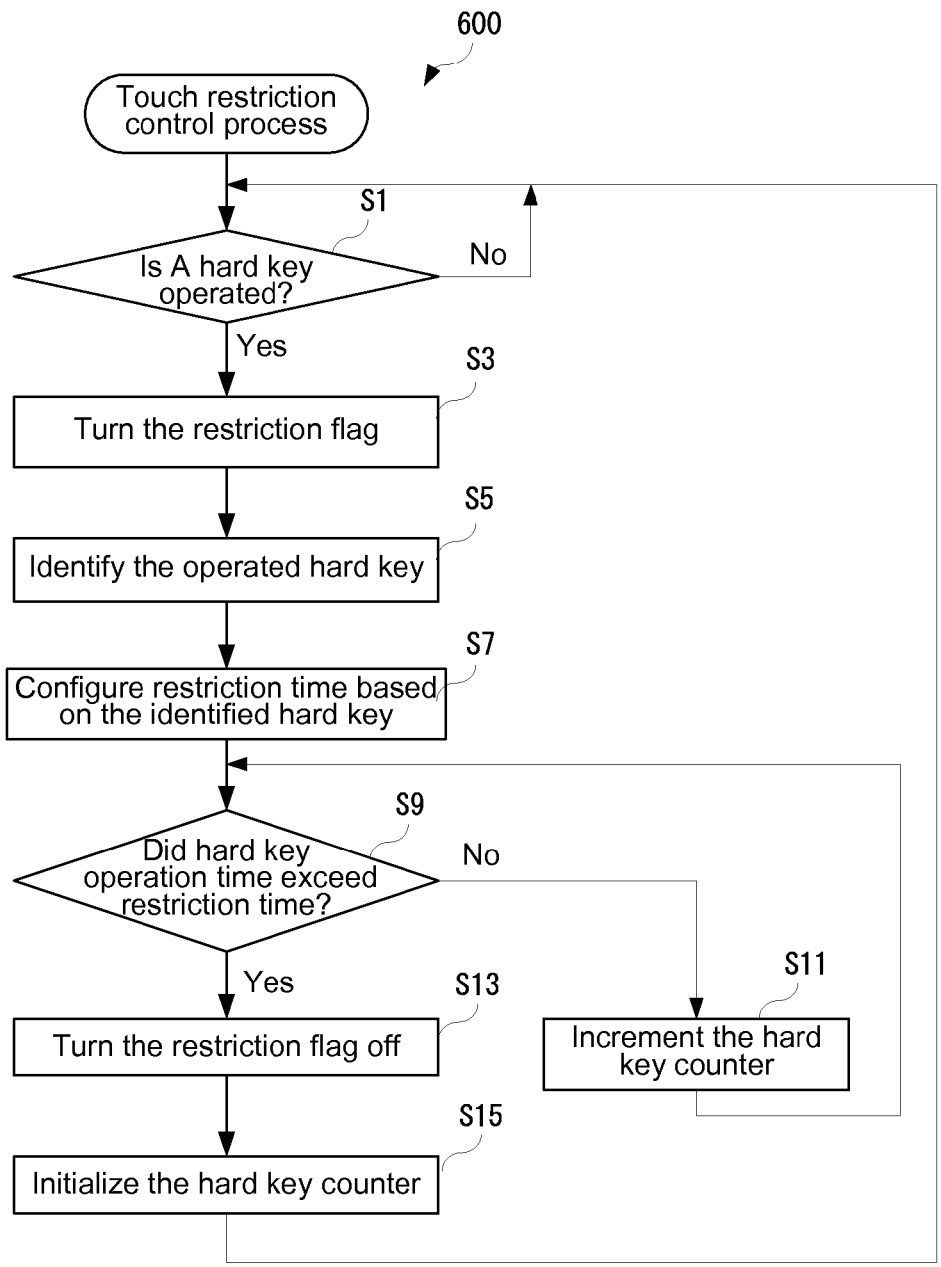
FIG. 6 is an illustration of an exemplary flow diagram showing a touch restriction control process according to an embodiment of the disclosure.

FIG. 6 is an illustration of an exemplary flow diagram showing a touch restriction control process 600 (process 600) according to an embodiment of the disclosure. The various tasks performed in connection with the process 600 may be performed by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a CPU such as the processor module 20 in which the computer-readable medium is stored. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5. In practical embodiments, portions of process 600 may be performed by different elements of the mobile device 10 for example comprises the antenna 12, the wireless communication module 14, the microphone 16, the speaker 18, the processor module 20, the key input device 22, the display driver 24, the display module 26, the flash memory module 28, the RAM memory module 30, the touch panel control module 32, the touch panel 34, the touch key control module 36, the touch keys 38, etc. The process 600 may have functions, material, and structures that are similar to the embodiments shown in FIGS. 1-5. Therefore common features, functions, and elements may not be redundantly described here.

When the mobile device 10 is turned on, for example, the processor module 20 determines whether or not the hard key is operated (inquiry task S1). In this manner, the inquiry task S1 determines whether or not flags that correspond to the call key 22a, the trackball 22b, and the call termination key 22c are turned on. The processor module 20 that executes the inquiry task S1 functions as a first detection module. If the inquiry task S1 determines that a hard key 22 is not operated (NO branch of inquiry task S1), it means all flags are not turned on, and the inquiry task S1 leads back to itself. However, if the inquiry task S1 determines that a hard key 22 is operated/activated (YES branch of inquiry task 51) and if the first hard key flag 344 that corresponds to the call key 22a is turned on, the restriction flag 342 is turned on (task S3). That is a touch on the touch key 38 is invalidated. The processor module 20 that executes the S3 process functions as an invalidating module.

The first detection module (processor module 20 performing task 51) detects operations against the hard key 22 by the flag 344 that changes its status when the hard key 22 is pressed. The first measurement module (processor module 20 in inquiry task S9 and task S11) measures a first operation time (first operation time), which starts after the hard key 22 operation is started when an operation against the hard key is detected. Invalidating module (processor module 20 in task S3) invalidate the touch key operations from the time hard key 22 operation is started until the first predetermined time (restriction time) is elapsed.

Task S5 identifies the hard key 22 that is being operated. That is, flags that are turned on and correspond to the call key 22a, the trackball 22b, and the call termination key 22c are identified. Subsequently, the task S7 process configures the restriction time based on the identified hard key. When, for example, the first hard key flag 344 is turned on, the restriction time is configured to Q1 based on the restriction timetable data 334. A value that indicates the configured Q1 is stored temporarily in the buffer 330 that configures restriction time.

Subsequently, inquiry task S9 determines whether or not the first operation time has exceeded the restriction time. For example, whether or not the configured restriction time is exceeded is determined after the call key 22a is operated. Thus, the processor module 20 determines whether or not a value of hard key counter 348 is greater than or equal to a value that is stored in the buffer 330 that configures the restriction time (inquiry task S9). If the value of the hard key counter 348 falls below the value stored in the buffer 330 that configures the restriction time (NO branch of the inquiry task S9), the value of the hard key counter 348 is incremented in task S11, and the process 500 leads back to the inquiry task S9. That is, the hard key counter 348 is incremented in the task S11 process to measure the first operation time. The processor module 20 that executes the inquiry task S9 and the task S11 functions as a first measurement module.

Otherwise, if the value of the hard key counter 348 becomes greater than or equal to the value stored in the buffer 330 that configures the restriction time (YES branch of the inquiry task S9), the restriction flag 342 is turned off (task S13). That is, invalidation of a touch on the touch key 38 is cancelled. In task S15, the hard key counter 348 is initialized, and the process 500 leads back to the inquiry task S1. That is, preparation is performed for the next operation by configuring the value of the hard key counter 348 to "0".

The inquiry task S9 and the task S11 are repeated approximately every 1 m second. Therefore, when a restriction time is 500 m seconds, the S9 task and the S11 task are repeated approximately 500 times.

Figure 7:
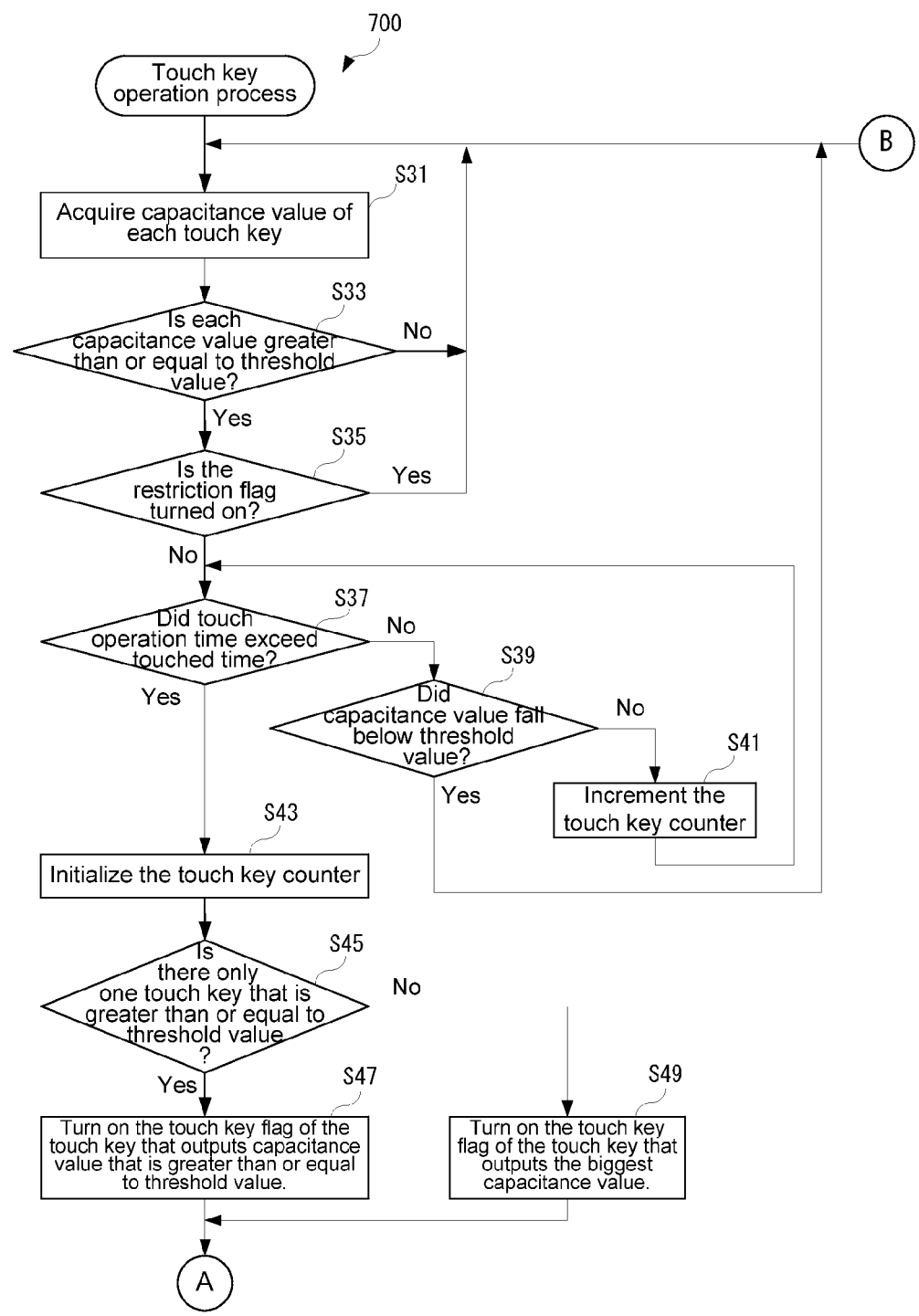
FIG. 7 is an illustration of an exemplary flow diagram showing a portion of a touch key operation decision process according to an embodiment of the disclosure.
Figure 8:
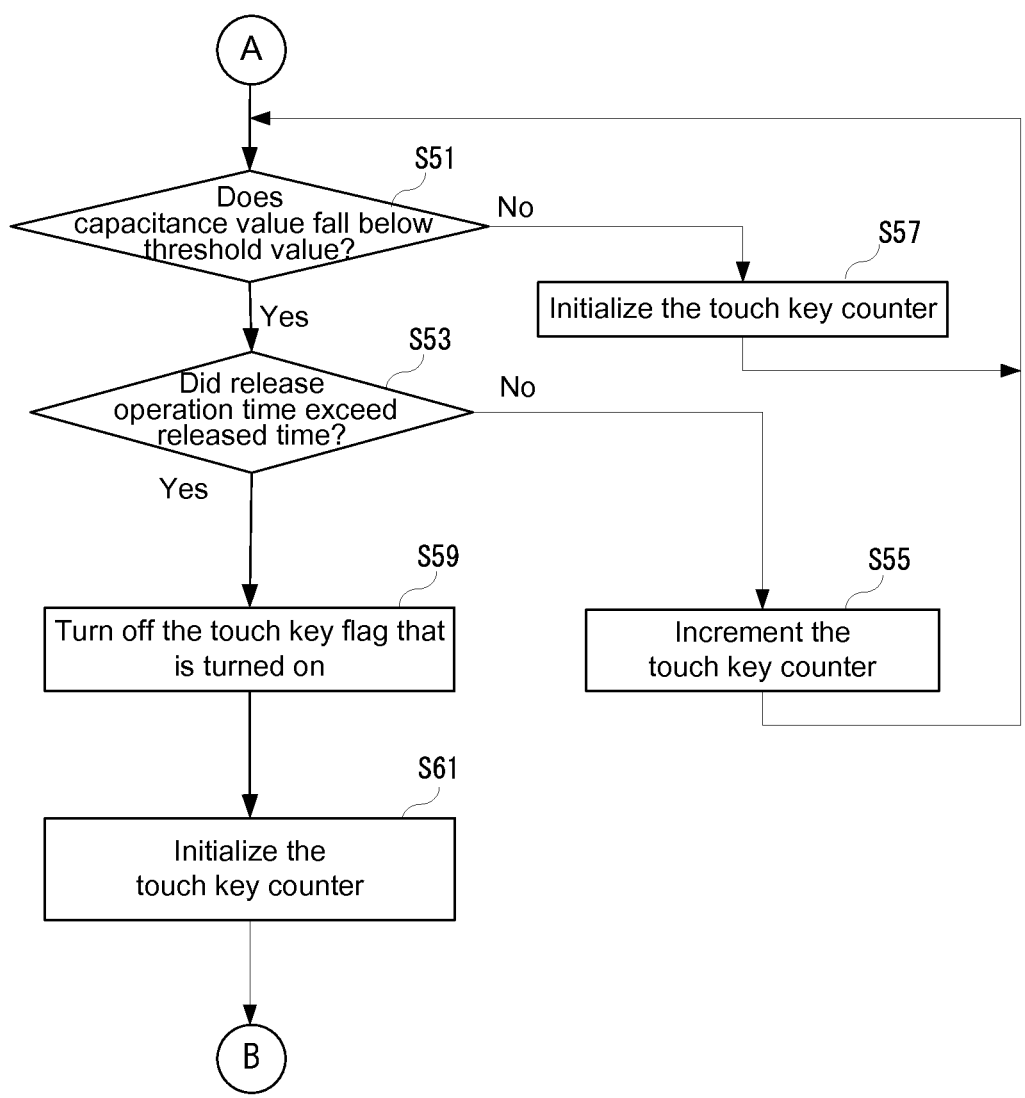
FIG. 8 is an illustration of an exemplary flow diagram showing a portion of a touch key operation decision process followed by the process in FIG. 7.

FIGS. 7-8 is an illustration of an exemplary flow diagram showing a touch key operation decision process 700 according to an embodiment of the disclosure. The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a CPU such as the processor module 20 in which the computer-readable medium is stored. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. For illustrative purposes, the following description of process 700 may refer to elements mentioned above in connection with FIGS. 1-6. In practical embodiments, portions of process 700 may be performed by different elements of the mobile device 10 for example comprises the antenna 12, the wireless communication module 14, the microphone 16, the speaker 18, the processor module 20, the key input device 22, the display driver 24, the display module 26, the flash memory module 28, the RAM memory module 30, the touch panel control module 32, the touch panel 34, the touch key control module 36, the touch keys 38. and the like. The process 700 may have functions, material, and structures that are similar to the embodiments shown in FIGS. 1-6. Therefore common features, functions, and elements may not be redundantly described here.

When the mobile device 10 is turned on, the processor module 20 acquires the capacitance value of each touch key 38 in task S31. That is, a value that is output by the touch key control module 36 is stored temporarily in the measurement value buffer. The processor module 20 that executes the task S31 functions as a measurement module. Inquiry task S33 determines whether or not each capacitance value is greater than or equal to a threshold value. That is, it determines whether or not each capacitance value that is stored in the measurement value buffer 332 is greater than or equal to the value that is indicated in threshold data 336.

If each capacitance value falls below the threshold value (NO branch of inquiry task S33), the process 700 returns to the task S31 because none of the touch key 38 is touched. However, if each capacitance value is greater than or equal to the threshold value (YES branch of inquiry task S33), whether or not the restriction flag 342 is turned on is determined in the inquiry task S35 because one of the touch key 38 is touched. In this manner, it is determined whether or not a touch operation on the touch key 38 is invalidated. If a touch operation is invalidated (YES branch of inquiry task S35), the program 700 returns to the task S31. Otherwise, if a touch operation is not invalidated (NO branch of inquiry task S35), process 700 proceeds to inquiry task S37.

The inquiry task S37 determines whether or not a touch operation time is exceeded the touched time. That is, whether or not a value of the touch key counter 350 is greater than or equal to the value that is indicated in the touched time data 340 is determined. If the touch operation time does not exceed the touched time (NO branch of inquiry task S37), inquiry task S39 process determines whether or not a capacitated value fell below a threshold value. That is, whether or not each capacitance value that is stored in the measurement value buffer 332 has fallen below the threshold value is determined. For example, when a finger is removed from the touch key 38 and each capacitance value that is stored in the measurement value buffer 332 falls below the threshold value (YES branch of inquiry task S39), the process 700 returns to the task S31.

Otherwise, if each capacitance value that is stored in the measurement value buffer 332 remains greater than or equal to the threshold value (No branch of inquiry task S39), the touch key counter 350 is incremented in the task S41, and the process 700 returns to the task S37. That is, the touch key counter 350 is incremented to measure a touch key operation time (second operating time) in the task S41. The processor module 20 that executes the S37 process and the task S41 functions as a second measurement module.

The second measurement module (processor module 20 in inquiry task S37 and task 41) measures the second operation time that is, for example, the time capacitance value that is output by touching the touch key remains as greater than or equal to a predetermined value. The touch/contact detection module (processor module 20 in inquiry task S47 and task 49), for example, detects a touch on the touch key when the second predetermined time is elapsed after the touch key is operated.

If the touch operation time exceeds the touched time (YES branch of inquiry task S37), the touch key counter 350 is initialized in the task S43. That is, a value of the touch key counter 350 is configured to "0" to count the touch operation time of a release.

Subsequently, it is determined in the inquiry task S45 whether or not there is only one touch key that is greater than or equal to the threshold value. That is, whether there are two or more touch keys that have capacitance values greater than or equal to the threshold value is determined when two or more touch key 38s are touched. If there is one touch key 38 that is touched (YES branch of inquiry task S45), the touch key flag of the touch key that outputs a capacitance value greater than or equal to the threshold value is turned on in the task S47. When, for example, the capacitance value of the first touch key 38a is greater than or equal to the threshold value, the first touch key flag 346 is turned on in the task S47.

Otherwise, if 2 or more touch key 38s are touched (NO branch of inquiry task S45), the touch key flag of the touch key that outputs the largest capacitance value is turned on in the task S49. When the third touch key 38c and the fourth touch key 38d are touched, for example, and the capacitance value of the fourth touch key 38d is larger than the capacitance value of the third touch key 38c, the fourth touch key flag that corresponds to the fourth touch key 38d is turned on. The processor module 20, which executes the task S47 or the task S49, functions as a second detection module or a touch detection module. The processor module 20, which executes the task S49, functions as an output detection module. The second detection module detects a touch on a touch key.

When, for example, a capacitance value falls below the predetermined value, the third measurement module (processing module 20 processing inquiry task S53, and inquiry task S55) measures a third operation time (release operation time) after the obtained value falls below the predetermined value. The decision/judgment module (processing module 20 processing task S59) determines that a finger is released from a touch key when, for example, the third predetermined time (released time) is elapsed after a finger that is touching the touch key is released.

After the task S47 or the task S49 is completed, inquiry task S51 determines whether or not a capacitance value falls below the threshold. That is, it is determined whether or not a finger has been released from the touch key 38. If a finger is released from the touch key 38 (YES branch of inquiry task S51), inquiry task S53 determines whether or not the release operation time exceeds the release time. In this manner, it is determined whether the value of the touch key counter 350 is greater than or equal to the value that is indicated in release time data 340. If a third predetermined time is not elapsed after a finger has been released (NO branch of inquiry task S51), the touch key counter 350 is incremented in the task S55. In this manner, the touch key counter 350 is incremented to measure the release operation time in the task S55. When the S55 process is completed, the process 700 returns to the task S51. The processor module 20, which executes the task S53 and the task S55, functions as a third measurement module.

If a capacitance value becomes greater than or equal to the threshold value (NO branch of inquiry task S51), the touch key counter 350 is initialized in the task S57, and the process 700 returns to the task S51. Thus, the touch key counter 350 is initialized to invalidate a release of the touch key 38 in the task S57.

If the third predetermined time is elapsed after a finger is released (YES branch of inquiry task S53), the touch key flag that is turned on is turned off in the task S59. When, for example, the user releases his or her finger from the first touch key 38*a* and the third predetermined time is elapsed, the first touch key flag 346 is turned off. The touch key counter 350 is initialized in the task S61, and the program returns to the task S31. The value of the hard key counter 348 is configured to "0" in preparation for the next touch operation. The processor module 20, which executes the task S59, functions as a judgment module.

Figure 9:
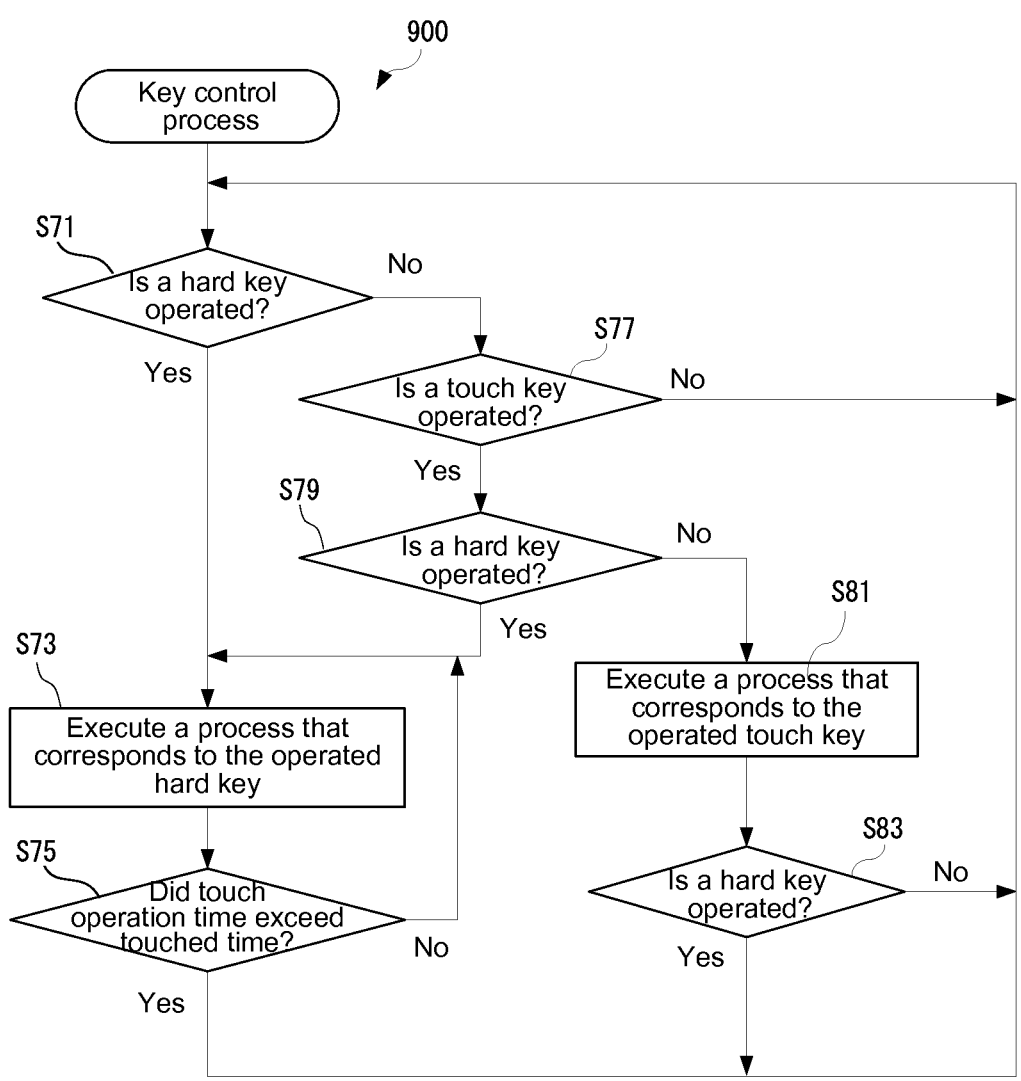
FIG. 9 is an illustration of an exemplary flow diagram showing a key operation process according to an embodiment of the disclosure.

FIG. 9 is an illustration of an exemplary flow diagram showing a key operation process 900 according to an embodiment of the disclosure. The various tasks performed in connection with the process 900 may be performed by software, hardware, firmware, a computer-readable medium having computer executable instructions for performing the process method, or any combination thereof. The process 900 may be recorded in a computer-readable medium such as a semiconductor memory, a magnetic disk, an optical disk, and the like, and can be accessed and executed, for example, by a CPU such as the processor module 20 in which the computer-readable medium is stored. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein. For illustrative purposes, the following description of process 900 may refer to elements mentioned above in connection with FIGS. 1-8. In practical embodiments, portions of process 900 may be performed by different elements of the mobile device 10 for example comprises the antenna 12, the wireless communication module 14, the microphone 16, the speaker 18, the processor module 20, the key input device 22, the display driver 24, the display module 26, the flash memory module 28, the RAM memory module 30, the touch panel control module 32, the touch panel 34, the touch key control module 36, the touch keys 38. and the like. The process 900 may have functions, material, and structures that are similar to the embodiments shown in FIGS. 1-8. Therefore common features, functions, and elements may not be redundantly described here.

Similar to the touch restriction control process 600, when the mobile device 10 is turned on, the processor module 20 determines whether or not a hard key is activated in the inquiry task S71. It is determined whether or not the first hard key flag 344 that corresponds to the call key 22*a*, the trackball 22*b*, and the call termination key 22*c* is turned on. If each hard key flag is turned off (NO branch of inquiry task S71), process 900 proceeds to the task inquiry task S77.

Otherwise, if the hard key flag is turned on (YES branch of inquiry task S71), a process that corresponds to the hard key 22 that is operated is executed in the task S73. For example, if the hard key 22 that corresponds to the trackball 22*b* is turned on, the processor module 20 executes a process that displays a menu screen on the display module 26 or a process that moves a cursor. Inquiry task S75 then determines whether or not executed processes are completed. For example, the inquiry task S75 determines whether or not the process that displays a menu screen on the display module 26 is completed. If the process is still running (NO branch of inquiry task S75), the process continues to run after returning to the task S73. Otherwise, if the executed processes are completed (YES branch of inquiry task S75), the process 900 returns to the task S71.

If there are no hard key flags that are turned on (NO branch of inquiry task S71), it is determined whether or not the touch key 38 is operated (inquiry task S77). If the touch key 38 is not also operated (NO branch of inquiry task S77), the process 900 returns to the inquiry task S71. Otherwise, if the first touch key flag 346 is turned on (YES branch of inquiry task S77), it is determined whether or not the hard key 22 is operated is (inquiry task S79). For example, whether or not the call termination key 22*c* is operated is determined after the fourth touch key 38*d* is touched by determining whether or not the hard key was operated, similar to the inquiry task S71, in the inquiry task S79. If one of the call key 22*a*, the trackball 22*b*, and the call termination key 22*c* is operated continuously after one of the touch key 38*s* is touched (YES branch of inquiry task S79), the process 900 proceeds to the task S73. Thus, a process that corresponds to operating the hard key 22 is executed with high priority, compared to a touch operation on the touch key 38.

If hard key 22 is not operated (NO branch of inquiry task S79), a process corresponding to the touch key 38 that is operated is executed in the task S81. For example, when the first touch key flag 346 is turned on, a function corresponding to the first touch key 38*a* is executed. It is determined whether or not the executed process is completed (inquiry task S83). In this manner, it is determined whether or not the process that was executed in the inquiry task S83 is completed. If the executed process is completed (YES branch of inquiry task S83), the process 900 leads back to the inquiry task S71. Otherwise, if the process is still running (NO branch of inquiry task S83), the process 900 leads back to the inquiry task S79, and it is determined whether or not the hard key 22 is operated. The processor module 20, which executes the inquiry task S79 process, functions as a prioritized module.

As shown above, the mobile device 10 comprises the call key 22*a*, the trackball 22*b*, and the call termination key 22*c* that are hard keys, and touch key 38 that comprises the first touch key 38*a* to the fourth touch key 38*d*. For example, when the call key 22*a* is operated, the processor module 20 detects the operation, and measures the first operation time after the operation. Touch operations on the touch key 38 are invalidated until the first operation time exceeds the restriction time for the call key 22*a*.

As mentioned above, when the hard key 22 is operated/activated operational errors on the touch key 38 are prevented by not accepting operations on the touch key 38 during the first predetermined time.

When a small touch panel is used as touch key 38, an area that is touched by a finger (touched area) can be calculated directly. For example, when a small touch panel is used, the touch key 38 is represented by central coordinates (Xp and Xy) and area coordinates (Xh and Yh). In this manner, the touch area can be calculated because capacitance changes of each coordinate (X and Y) can be detected.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 20 to cause the mobile device 10 to perform specified operations. Such instructions, generally referred to as "computer program code" or "program code" (which may be grouped in the form of computer programs or other groupings), when executed, enable the method of controlling key operations of the mobile device 10.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the disclosure.

Additionally, memory or other storage, as well as communication components, may be employed in embodiments of the disclosure. It will be appreciated that, for clarity purposes, the above description has described embodiments of the disclosure with reference to different functional units and processors. However, it will be apparent that any suitable distribution of functionality between different functional units, processing logic elements or domains may be used without detracting from the disclosure. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. In addition, the inclusion of a feature in one category of claims does not imply a limitation to this category, but rather the feature may be equally applicable to other claim categories, as appropriate.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 20 to cause the processor module 20 to perform specified operations. Such instructions, generally referred to as "computer program code" or "program code" (which may be grouped in the form of computer programs or other groupings), when executed, enable a grid-menu display-control method of the mobile device 10.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile device, comprising:
   a first hard key and a second hard key;
   one or more touch keys;
   a memory storing a first predetermined time period corresponding to the first hard key and a second predetermined time period corresponding to the second hard key, wherein the first and second predetermined time periods are different from each other;
   a first detection module operable to detect a first operation of either the first hard key or the second hard key;
   a first measurement module operable to start measuring a first operation time of the first operation when the first operation is detected; and
   a control module operable to invalidate a second operation of at least one of the touch keys until the first operation time exceeds either the first predetermined time period if the first hard key was operated or the second predetermined time period if the second hard key was operated.

2. The mobile device according to claim 1, wherein the control module is further operable to invalidate the second operation by turning off power to the touch keys.

3. The mobile device according to claim 1, wherein the control module is further operable to invalidate the second operation by invalidating an output signal from the one or more of the touch keys when the second operation is detected.

4. The mobile device according to claim 1, wherein the first predetermined time period and the second predetermined time period are set based on a predetermined usage assigned to each of the first and second hard keys, respectively.

5. The mobile device according to claim 1, further comprising a second detection module operable to detect the second operation of one of the touch keys, wherein the control module is further operable to prioritize a first processing in response to the first operation over a second processing in response to the second operation if the first operation is detected while the second operation is detected or the second processing is in progress.

6. The mobile device according to claim 1, further comprising:
a touch key control module operable to obtain an output value outputted from one of the touch keys;
a second measurement module operable to start measuring a second operation time of the second operation if the output value exceeds a first predetermined threshold value; and
a touch detection module operable to detect a touch on the touch key when the second operation time exceeds a third predetermined time.

7. The mobile device according to claim 6, further comprising:
a third measurement module operable to start measuring a third operation time when the output value is less than a second predetermined threshold value; and
a decision module operable to decide whether a contacted object is released from the one of the touch keys if a third operation time exceeds a third predetermined time.

8. The mobile device according to claim 6, wherein the touch detection module further is further operable to selectively detect the touch key from which a highest capacitance value is outputted, if the touch key control module obtains two or more output values which are outputted from the touch keys and all of which exceed one or more respective predetermined threshold values.

9. The mobile device according to claim 6, wherein at least one of the hard keys and at least one of the touch keys are located on a same surface of a housing thereof.

10. A method of controlling key operations of a mobile device comprising one or more hard keys and one or more touch keys, the method comprising:
detecting an operation of either a first hard key or a second hard key to detect a hard key operation;
storing a first predetermined time period corresponding to the first hard key and a second predetermined time period corresponding to the second hard key wherein the first and second predetermined time periods are different from each other;
measuring a hard key operation time when the hard key operation is detected; and
invalidating touch key operations of the one or more touch keys until the hard key operation time exceeds either the first predetermined time period if the first hard key was operated or the second predetermined time period if the second hard key was operated.

11. The method of claim 10, further comprising invalidating the touch key operations by turning off power to the one or more touch keys.

12. The method of claim 10, further comprising invalidating the touch key operations by invalidating an output signal from the one or more touch keys when the touch key operations are detected.

13. The method of claim 10, further comprising detecting the touch keys operations, and prioritizing a first processing in response to a first operation over a second processing in response to a second operation if the first operation is detected while the second operation is detected or the second processing is in progress.

14. The method of claim 10, further comprising:
detecting a contact of one of the touch keys;
obtaining a capacitance value outputted from the one of the touch keys;
measuring a touch key operation time of the one of the touch keys if the capacitance value exceeds a threshold value; and
detecting a touch on the one of the touch keys when the touch key operation time exceeds a third predetermined time.

15. The method of claim 14, further comprising:
measuring a third operation time when the capacitance value is less than a third threshold value; and
deciding whether a contacted object is released from the one of the touch keys if the third operation time exceeds a fourth predetermined period of time.

16. The method of claim 10, further comprising selectively detecting one of the touch keys from which a highest capacitance value is outputted, if two or more capacitance values outputted from the touch keys exceed one or more respective threshold values.

17. A non-transitory computer readable medium storing program code that when executed performs a method for controlling key operations of a mobile device comprising one or more hard keys and one or more touch keys, the method comprising:
detecting an operation of either a first hard key or a second hard key to detect a hard key operation;
storing a first predetermined time period corresponding to the first hard key and a second predetermined time period corresponding to the second hard key, wherein the first and second predetermined time periods are different from each other;
measuring a hard key operation time when the hard key operation is detected; and
invalidating touch key operations of the one or more touch keys until the hard key operation time exceeds either the first predetermined time period if the first hard key was operated or the second predetermined time period if the second hard key was operated.

18. The non-transitory computer readable medium of claim 17, wherein the method further comprises detecting the operations of the touch keys, and prioritizing a first processing in response to a first operation over a second processing in response to a second operation if the first operation is detected while the second operation is detected or the second processing is in process.

19. The non-transitory computer readable medium of claim 17, wherein the method further comprises:
detecting a contact of one of the touch keys;
obtaining a capacitance value outputted from the one of the touch keys;

measuring a touch key operation time of the one of the touch keys if the capacitance value exceeds a threshold value; and detecting a touch on the one of the touch keys when the touch key operation time exceeds a third predetermined time.

20. The non-transitory computer readable medium of claim 17, wherein the method further comprises selectively detecting one of the touch keys from which a highest capacitance value is outputted, if two or more capacitance values outputted from the touch keys exceed one or more respective predetermined threshold values.

\* \* \* \* \*